March 27, 1951 E. R. GREER 2,546,339
ROTARY JET ACTUATED APPARATUS FOR ACCELERATING
DISCHARGE AND DISPERSION OF SNOW
AND OTHER MATERIAL
Filed July 6, 1948 5 Sheets-Sheet 1
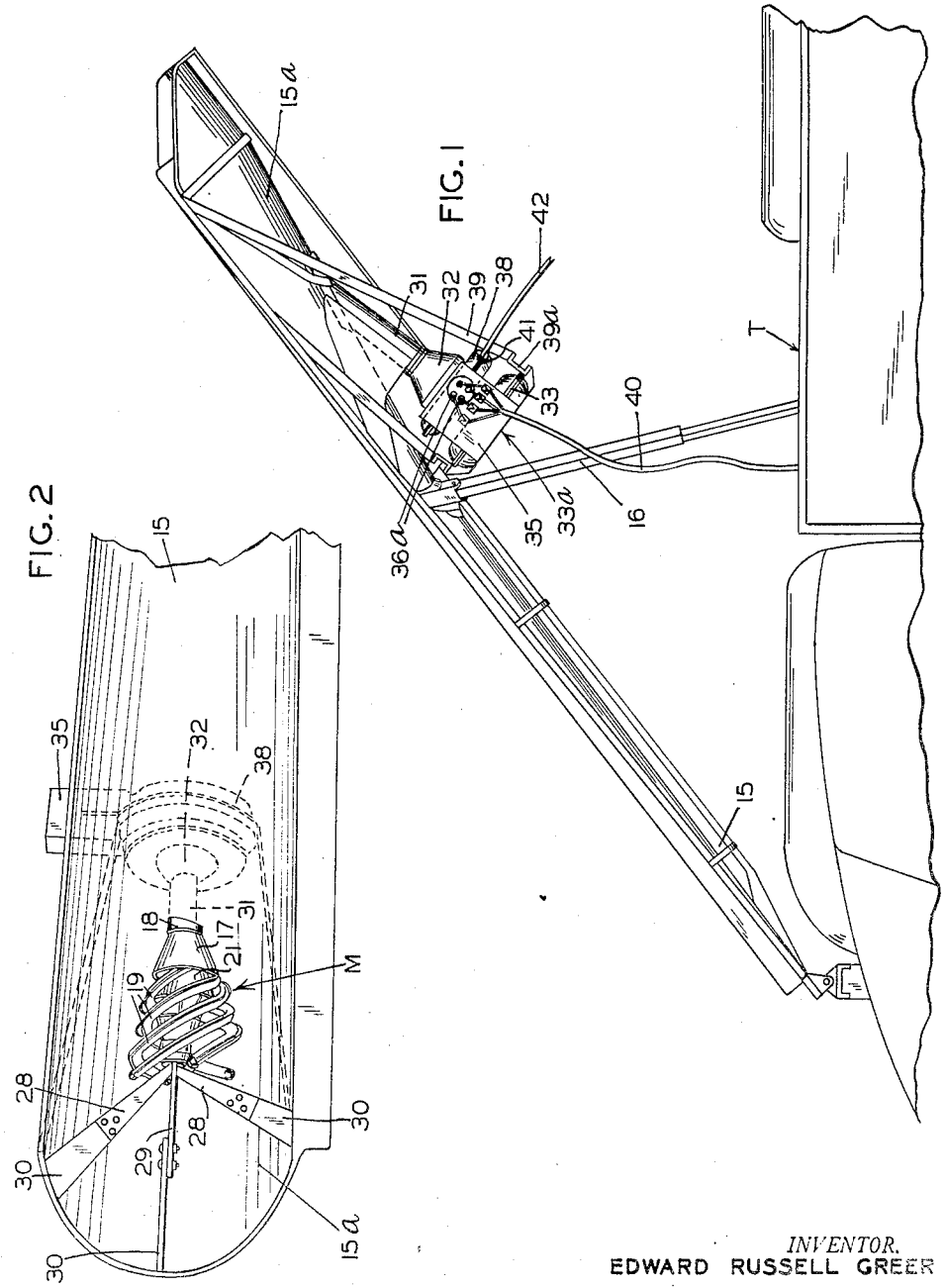
INVENTOR.
EDWARD RUSSELL GREER
BY
Williamson & Williamson
ATTORNEYS March 27, 1951  E. R. GREER  2,546,339
ROTARY JET ACTUATED APPARATUS FOR ACCELERATING
DISCHARGE AND DISPERSION OF SNOW
AND OTHER MATERIAL Filed July 6, 1948  5 Sheets-Sheet 2

INVENTOR.
EDWARD RUSSELL GREER

BY
*Williamson & Williamson*

ATTORNEYS

INVENTOR.
EDWARD RUSSELL GREER
BY
Williamson & Williamson
ATTORNEYS

March 27, 1951 E. R. GREER 2,546,339
ROTARY JET ACTUATED APPARATUS FOR ACCELERATING
DISCHARGE AND DISPERSION OF SNOW
AND OTHER MATERIAL
Filed July 6, 1948 5 Sheets-Sheet 4

INVENTOR.
EDWARD RUSSELL GREER
BY
Williamson + Williamson
ATTORNEYS

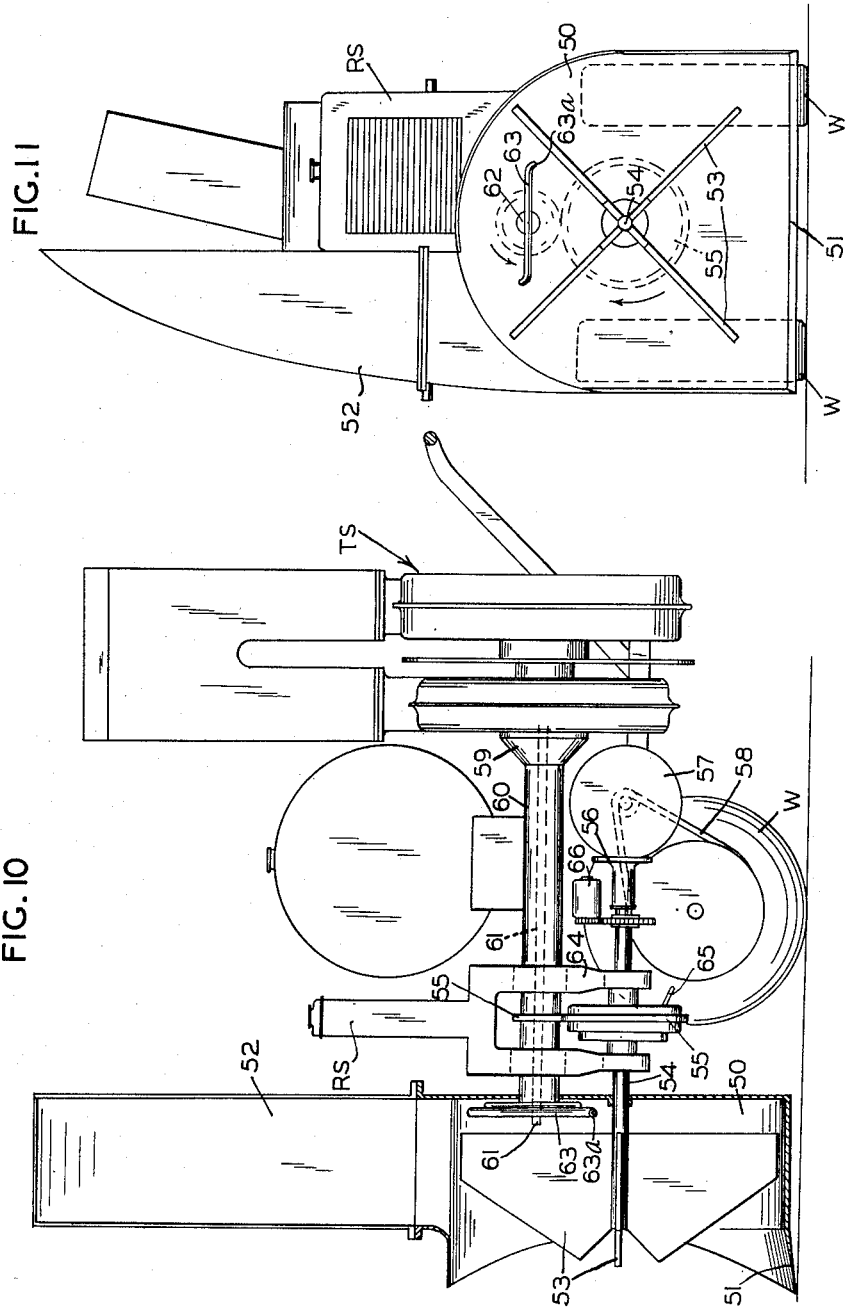

Patented Mar. 27, 1951

2,546,339

UNITED STATES PATENT OFFICE 2,546,339

ROTARY JET ACTUATED APPARATUS FOR ACCELERATING DISCHARGE AND DISPERSION OF SNOW AND OTHER MATERIAL

Edward Russell Greer, Wayzata, Minn.

Application July 6, 1948, Serial No. 37,154

14 Claims. (Cl. 37—12)

This invention relates to apparatus for removing and very materially expediting the removal and dissipation of snow, ice and other material.

In my Patent No. 2,404,287 issued July 16, 1946 and in my co-pending application for United States Letters Patent, Serial Number 606,061, filed July 20, 1945, now matured into Patent No. 2,474,840, issued July 5, 1949, several forms of apparatus were disclosed, employing in combination with a snow guiding or plowing member such as a mold board, the action of a high velocity blast obtained from a powerful blower or preferably, a jet burner and directed into and/or against the moving snow or other material in the general direction of travel thereof to greatly accelerate the removal and dissipation of the material.

My present invention provides some important advanced steps in the art over the several forms of material-moving apparatus disclosed in said identified patent and co-pending application in that not only is a powerful and high velocity blast or blasts utilized for greatly accelerating and materially dissipating snow and other material moved along a guiding element, but the expulsion of such blast or blasts is further utilized in a highly efficient manner to rapidly revolve and drive a material-propelling element.

My present invention further provides apparatus for producing and directing a blast or blasts preferably from a jet burner, at extremely high velocity in such manner as to very efficiently direct the blasts against material moving relatively slowly along a guiding or plowing member through a mechanism which constitutes also a high speed material-propelling element. This element is associated with a snow or other material-guiding member such as a mold board to mechanically accelerate the discharge of the material simultaneously with the expulsion and by means of the expulsion of the blasts against material being moved.

A further object of my present invention is the provision of jet-driven apparatus adapted to be readily attached to conventional plows or material-moving members and eliminating the need of shaft driven rotors for widely dispersing the snow or other material moved and in so doing, very greatly expediting the dissipation of the snow or other material while producing material economy in fuel and installation costs.

Another object is the provision and apparatus of the class described of a combination propelling rotor and jet discharge element revolved at high speed by the thrust action of one or more discharge jets therefrom and functioning in conjunction with a material-guiding member such as a mold board, to mechanically convey snow or other material while further functioning to discharge and distribute at very high velocity in sprayer fashion, one or more blasts of preferably hot, gaseous matter against and into the snow or other material being moved, to thereby greatly accelerate the dispersion and dissipation of such material.

Still another object is the provision of a compact turbo-super charger unit with a jet burner cooperatively associated therewith, adapted for support from and attachment to the rear side of a material-guiding member such as a mold board, combined with rotational hot air discharge means at the front side of the material-guiding member whereby the thrust action of the jet discharge imparts revolution to said discharge means engaging and moving the material while discharging a hot blast in rotary sprinkler manner against and into the material being moved.

These and other objects and advantages of my invention will more fully appear from the following description made in connection with the accompanying drawings wherein like reference characters refer to similar parts throughout the several views and in which:

Fig. 1 is a plan view showing a form of my invention applied to the outer and flared end of a wing plow or mold board supported from one side of a propelling vehicle;

Fig. 2 is a fragmentary side elevation taken from a point at the right side of said vehicle and looking towards the outer end of the mold board;

Fig. 10 is a view mostly in side elevation with some portions shown in vertical section illustrating another form of my invention applied to a small rotary snow plow of the side walk or driveway type; and Fig. 11 is a front elevation of the plow and my improved apparatus, as shown in Fig. 10.

Figure 3:
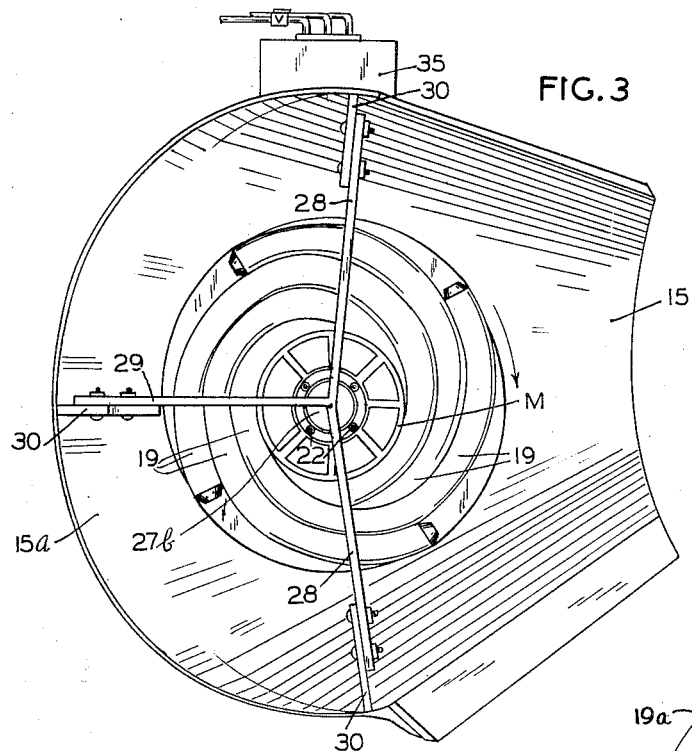
Fig. 3 is an end elevation looking forwardly from the rear of the mold board with my jet discharge rotor applied thereto.
Figure 9:
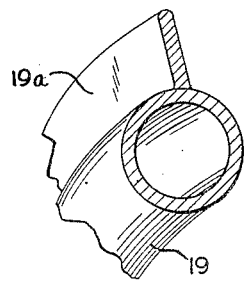
Fig. 9 is a detail perspective view showing a portion of one of the jet conduits with a screw conveyor or auger edge attached thereto.
Figure 5:
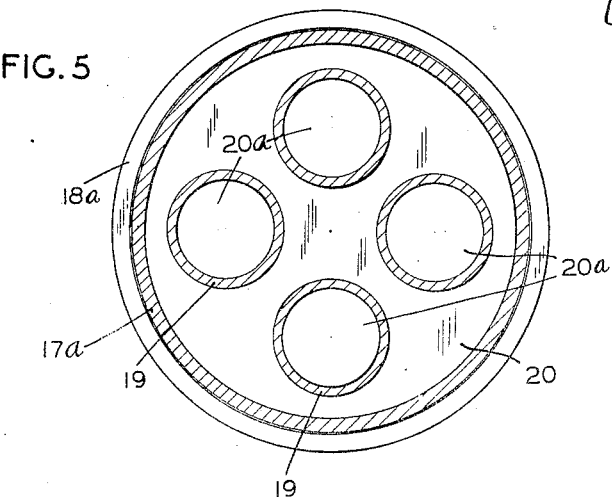
Fig. 5 is a cross section taken on the line 5—5 of Fig. 4 showing the multi-conduit construction of my rotor.
Figure 4:
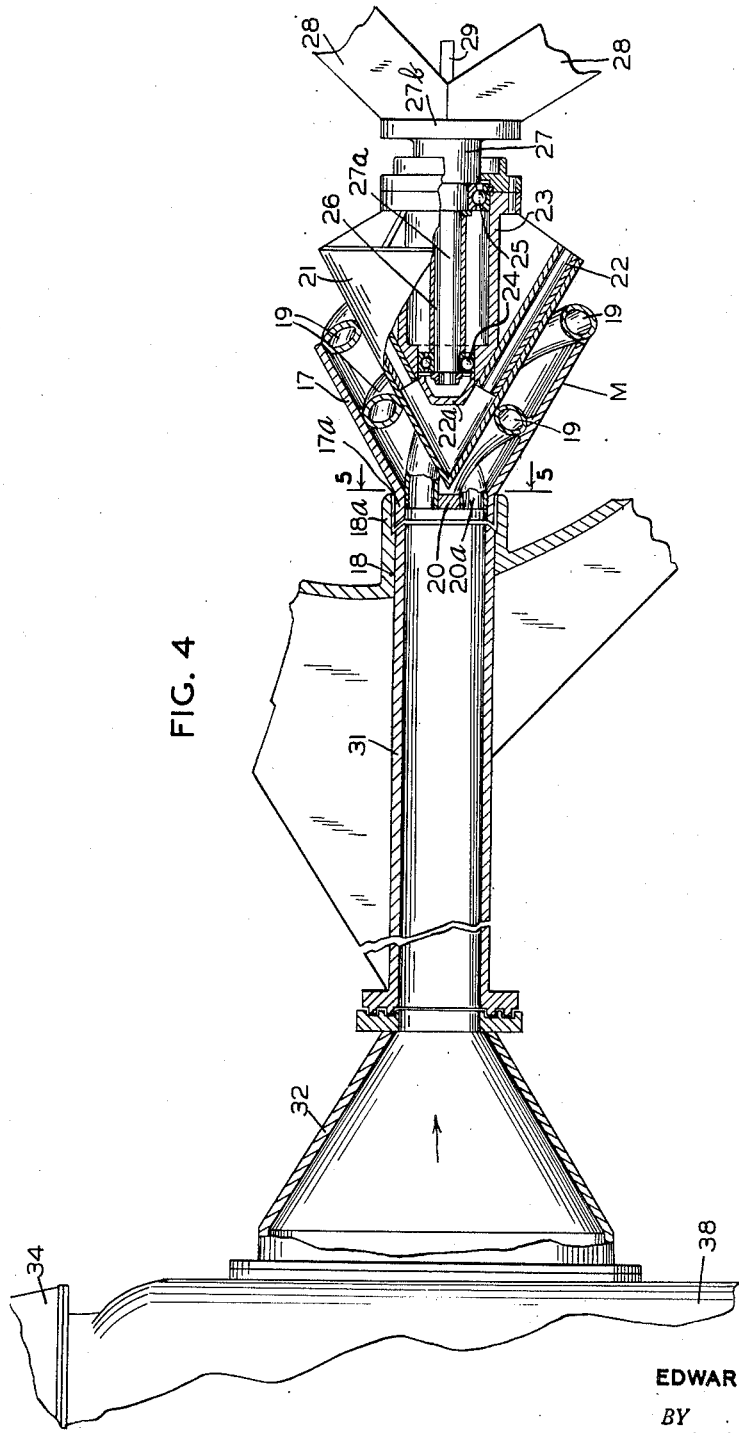
Fig. 4 is a view mostly in vertical section taken longitudinally through the discharge of a suitable form of jet burner unit mounted at the rear of the mold board and showing my rotary snow-propelling element and multi-jet discharge member operatively connected therewith at the material guiding side of the mold board.

Referring now to the form of the invention shown in Figs. 1 to 8 inclusive, my apparatus is shown as mounted upon a side wing plow of the type illustrated in United States Letters Patent No. 2,199,723, issued May 7, 1940, having an elongated mold board 15 mounted for elevational and horizontal swinging adjustment at its forward end and suitably and adjustably braced at its medial portion by a telescoped brace bar construction 16, the inner end of which is attached to the side of a propelling vehicle or truck, indicated as an entirety by the letter T. The mold board 15 has a rearwardly and outwardly flaring outer end 15a wherein in the form illustrated, the material-removing elements of my apparatus are mounted.

I provide a jet driven, preferably multi discharge rotor and blast distributing member indicated as an entirety by the letter M and revolubly mounted within the concave portion 15a of the mold board with its axis extending at a rather sharp acute angle to the longitudinal center line of the mold board and with its periphery or overall figure generated by the revolution thereof, extending at one side in substantially close and parallel relation to the mold board portion 15a.

As shown my combined rotor and blast distributing member M (see Figs. 2 and 4) is of general, over-all frusto-conical shape having its forward or inner end forming a tubular, cylindrical journal 17a which is journaled internally in a bearing 18a formed by a sleeve 18 which is welded or integrally constructed with the end 15a of the mold board. The truncated conical member 17 of which the journal 17a constitutes the inner extremity, flares outwardly and serves as an external mounting for a plurality of spirally disposed jet conduits 19. Conduits 19 are spirally and symmetrically arranged, as shown in Fig. 2, so that their inner extremities extend in circumferentially spaced relation to the axis of truncated conical mounting member 17 and are circumferentially spaced to be rigidly connected for registration with ports 20a formed in a closure disc 20 which is fixed within the tubular journal 17a. The jet conduits 19 are fixed as by welding, between the outer mounting cone 17 and an inner mounting cone 21, serving to rigidly secure the inner mounting cone as a part of the integral rotor unit. Inner mounting cone 21 on its interior, rigidly carries a plurality of cooling tubes 22 which are interconnected at their inner ends with a spider head 22a disposed co-axially with the mounting cone 21. A bearing carrying sleeve 23 has its inner end turned to frusto-conical shape to engage with and be fixed to the inner ends of cooling tube 22 and spider head 22a, said sleeve at its inner and outer ends, internally carrying bearing races 24 and 25. Sleeve 23 has a smaller concentric sleeve 26 affixed therein which sleeve is adapted to telescopically receive the diminished end 27a of a stationary mounting shaft which has a flanged attachment collar 27b at the outer end thereof, fixed or otherwise supported from a pair of angularly arranged attachment arms 28. A third attachment arm 29 similar in structure to arms 28, is welded or otherwise rigidly secured at its outer end to the extremities of arms 28 to form a tripod mounting for the collar 27b of shaft 27. Said arms 28 and 29 diverge radially from the axis of shaft 27 and have flared attachment portions which are adapted to be detachably secured to supporting legs 30 fixed at appropriate points to the outer and rearward end of mold board portion 15a. When the tripod structure is detached and pulled, the entire rotor structure is free to be pulled outwardly, disconnecting the journal sleeve 17a with the outer end of sleeve member 18 affixed to the mold board.

Co-axially fixed within tubular member 18 of the mold board, is an elongated cylindrical jet discharge duct 31 having its outer end disposed within the inner portion of sleeve 18 and having its body extended rearwardly through the mold board and some distance rearwardly therebeyond, to connect and communicate through sealed connection with the truncated conical discharge proper 32 of a compact jet burner unit mounted and supported from the rear of the flared portion 15a of the mold board. While any source of a very powerful jet blast of hot or cold air may be successfully utilized with my apparatus, I prefer to employ a jet burner (rather than a high pressure blower or air compressor) and a jet burner of the type burning hydrocarbon fuel.

Figure 6:
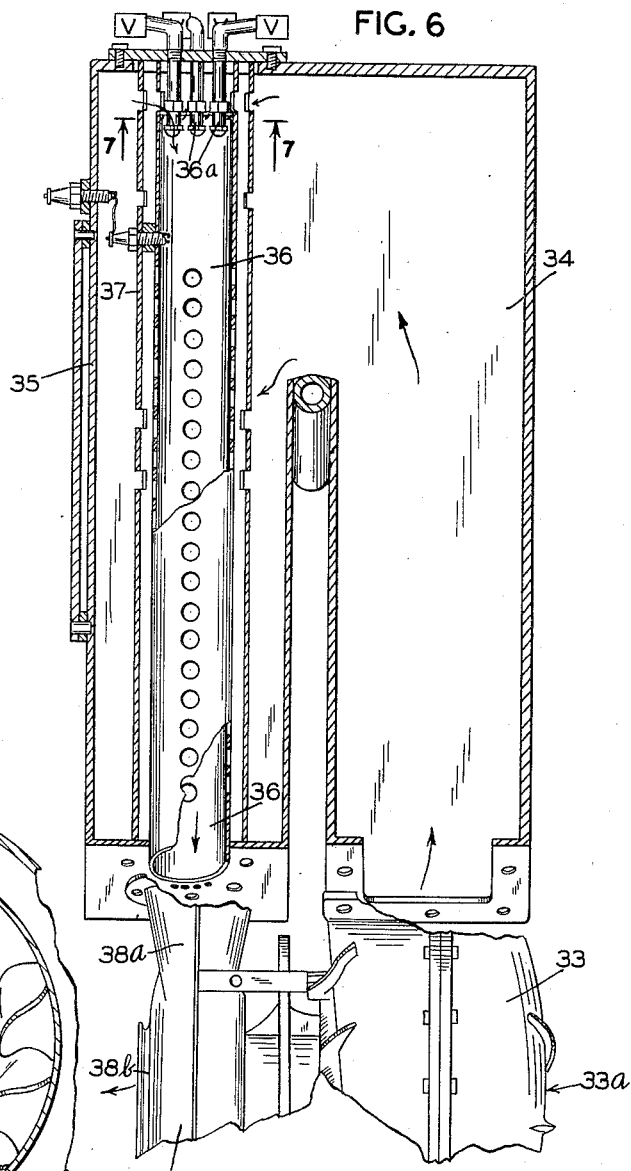
Fig. 6 is a view mostly in vertical section through the jet burner and its intake casing forming a part of my turbo-super charger unit.
Figure 8:
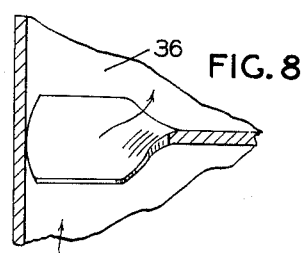
Fig. 8 is a detail cross sectional view on a still larger scale taken on approximately the line 8—8 of Fig. 7.
Figure 7:
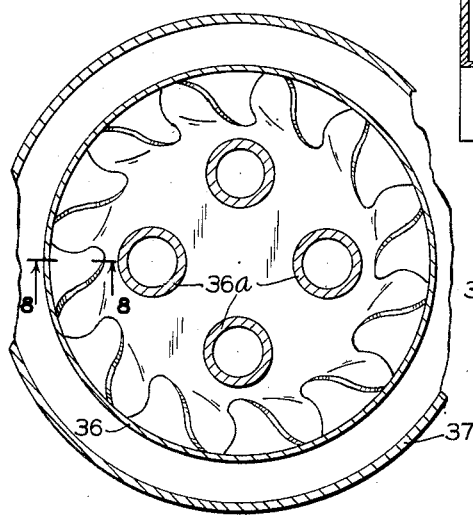
Fig. 7 is a cross section on an enlarged scale taken on the line 7—7 of Fig. 6.

As illustrated, I provide a compact unit which includes a supercharger 33 of conventional type having its air intake 33a disposed centrally and axially of its casing and delivering tangentially to the upwardly extending box-like air intake passage 34 of an inverted, U-shaped hydrocarbon jet burner (see Figs. 1 and 6). The upper end of air intake passage 34 communicates with a vertically disposed box-like burner case 35 in which a jet burner of conventional form is mounted in spaced relation having its fuel jets 36a as shown, disposed in circumferentially spaced relation at the upper end of a vertical burner tube 36. Burner tube 36 has air communication through a number of longitudinally spaced lateral ports with an outer concentric vertical tube 37 which in turn, has communication with the upper portion of box 35 through a series of spaced lateral air intake ports. Air and products of combustion are delivered from the lower end of burner tube 36 to the tangentially arranged intake 38a of a conventional turbine 38 which is driven at high speed and which in turn, drives the supercharger through the terrific blast of discharged products of combustion from burner tube 36. The turbine 38 and supercharger 33 have their rotors affixed to an integral shaft and together constitute a turbo-supercharger. Products of combustion under high pressure and terrific velocity are discharged from the rear face and central portion 38b of the turbine which is concentrically in communication with the discharge proper 32 of the burner unit.

The entire turbo-supercharger and burner unit may be conveniently, bodily supported from a suitable rigid framework 39, comprising a crate-like frame having a plurality of inwardly extending rigid bars arranged in crate-like formation and suitably braced and provided with a heavy mounting ring 39a at their outer ends.

Hydrocarbon fuel under pressure may be supplied to burner nozzles 36a through a flexible conduit 40 having branch connections with said nozzles and connected at its inner end with a tank mounted upon the propelling vehicle.

Referring again to the combined material-propelling rotor and blast distributing member M, it will be noted (see Fig. 2) that the outer extremities of the several (as shown, 4) spirally arranged jet conduits 19 are disposed in circumferentially arranged relation to the axis of the rotor but are directed so that their individual discharge jets are substantially tangential to the peripheral revolution at the outer rear end of the rotor. Thus, the jet propulsion from the individual conduits 19 serves as the power for rotating at high speed, the unit M.

*Operation*

In use, the jet burner is ignited and the turbo-supercharger started through the medium of starting mechanism such as the steam or compressed air nozzle 41 directed against the blades of the turbine and the vehicle from which the mold board and my mechanism is supported, is moved forwardly causing the mold board to engage, plow and guide snow or other material rearwardly and in an outward direction. The mass of snow or accumulated material passes outwardly to the outer flared portion 15a of the mold board where it is first engaged by the very rapidly revolving, propelling rotor M and more specifically, the spirally arranged jet conduits. The spirally arranged jet conduits 19, with or without the ribbed edges 19a, produce a screw conveyor or auger action on the material, very materially expediting the travel of material outwardly over the portion 15a of the mold board and simultaneously producing a melting action and disintegration of the snow, ice or other material. Immediately thereafter, in the manner of a rotary sprayer head, high velocity jet blasts are directed against and into the snow or other material from the discharge ends of the spiral jet conduits 19. These blasts in the very rapid revolution of the rotor M exert a rearward thrust against the material and further create a partial vacuum which draws the snow and other material directly into the blast and due to the tremendous expansion at the moving points of discharge of conduits 19, the multitude of air cells within the body of snow or other material, are instantly expanded, thus separating the material into a multitude of small particles and dispersing the same in all directions, but in a general rearward and outward direction.

In operating upon snow and ice, the heat from the rotary spray discharge melts a considerable proportion of the snow, lubricating the plow and particles of snow to further expedite the discharge and to dissipate to a material extent, the solid nature of the material.

The compact cooperative relationship of my unitary burner and turbo-supercharger mechanism mounted in close relation to the driven rotor produces a high efficiency and obtains from a relatively small burner, great power in the blasts of hot air and products of combustion discharged from the rotary spindle or head M.

The jet propulsion thrust is produced by a large volume of air under pressure at very high temperature escaping to atmosphere through the discharge nozzles of spiral conduits 19. Since propulsion efficiency is highest when the jet itself is moving, at half the velocity of the jet fluid it is very advantageous to rotate the jet at high peripheral speed when it is mounted in a slow moving unit such as a snow plow.

The torque reaction from the fast moving jets rotates the spiral conduits 19 to convey the snow at uniformly increasing speed until the jet fluid itself strikes the material to blast it away. To produce this hot air under adequate pressure, a turbo-supercharger unit is provided for "bootstrap" operation, making a jet engine. By "bootstrap" operation is meant the connection or attachment of the supercharger to the body and frame of the jet burner and its turbine through simple connection means wherein the burner and its turbine completely supports the supercharger. This engine may be started by an electric starter, by a jet from a compressed air supply or any convenient means, to give the turbo-rotor an initial spin while fuel is sprayed into the combustion chamber and ignited.

With my apparatus, a material economy is effected as contrasted with the installation and operation expense of shaft driven rotary snow plows or other media utilized at this time for widely dispersing and dissipating snow, ice and other material. The economy in operation is largely effected by my apparatus in that a more complete dissipation and blasting of the snow or other material is achieved without building up banks or accumulations of the material dispersed. The snow or other material is cleared away and dissipated in much faster operation than with any other method heretofore utilized.

Material economy in installation cost is achieved, since the weight of the jet engine employed in my apparatus is much less than the requisite power plant for operating shaft-driven snow-removal apparatus. Furthermore, the cost of fuel for a jet burner is materially less than the cost of fuel used in internal combustion engines employed for shaft driven apparatus. No gears or drive shaft are required in my apparatus, as contrasted with competitive apparatus. Thus, maintenance and repair is less on my apparatus.

The discharge reaction from the several discharge nozzles of jet conduits 19, assists in driving the machine into the snow, thereby increasing the speed of the plow while also assisting in the balance of the plow to facilitate steering of the vehicle on which the mold board is mounted.

In Figs. 10 and 11, an application of important features of my invention to a small, compact, shaft-driven rotary snow plow, is illustrated.

The snow plow proper is of the type used for driveways, sidewalks and airplane landing strips, employing a two wheeled vehicle with the axially aligned wheels W disposed intermediately of the frame and having a rotor casing 50 mounted at the forward end of the vehicle and provided with a cutting edge 51 at the lower forward edge thereof and with an upwardly extending shiftable discharge chute 52 communicating with the upper interior of the rotor casing 50 in the well known tangential manner. A multi blade rotor 53 is mounted within casing 50, fixed to a horizontal, driven shaft 54 which extends longitudinally below the frame of the vehicle through a transmission mechanism mounted in housing 55. The rear end of the rotor shaft 54 terminates in a flange 56 engageable with a friction disc 57 forming a friction drive transmission including clutch-reversing mechanism and reduction gearing. Friction wheel 57 connects by chain or belt 58 to the wheels W of the vehicle.

A turbo-supercharger unit indicated as an entirety by the letters TS is mounted suitably on the frame of the vehicle and at the rear thereof, having its discharge 59 disposed forwardly and horizontally from the turbine of the unit and communicating with a straight, tubular conduit 60 which extends forwardly of the vehicle to the interior of the rotor housing 50. The structure of the turbo-supercharger and the jet burner therein, are substantially identical with the turbo-supercharger unit utilized in the form of my invention first described and will therefore, not be described in detail here.

The common horizontal shaft 61 for the turbine and supercharger of the unit, is extended forwardly within and axially of conduit 60 and beyond the forward end thereof, into the rear portion of the rotor housing 50. A head 62 having communication with provision for rotation thereof with the forward end of conduit 60, is affixed to the forward end of shaft 61 and has rigidly fixed thereto, two or more jet discharge arms 63, which terminate in curved discharge nozzle 63a directed substantially tangentially of the orbit of the arms.

From the foregoing, it will be seen that the shaft 61 and jet discharge arms 63 are driven at high speed by the action of the turbine in unit TS and are further accelerated and driven by jet expulsion of the hot jet blasts from the discharge nozzles 63a.

A radiator system RS of the circulating cooling type is mounted on the vehicle frame, just rearwardly of the rotor housing 50 and as shown, has jackets 64 which surround bearings for the rotor shaft 54, serving to cool these bearings as well as to absorb heat from within the transmission housing 55.

Within the transmission housing 55, a reduction gear mechanism connects shaft 61 to shaft 54. The friction drive 56 and 57 is adapted to disconnect the shaft 54 from the wheels W. An electric starting motor 66 is suitably mounted from the frame of the vehicle, having gear driving engagement with the rotor shaft 54, as shown in Fig. 10.

From the foregoing, it will be seen that all power for driving the snow-engaging rotor 53 as well as the jet rotor comprising nozzle arms 63, is supplied from the turbo-supercharger unit and jet burner.

Jet discharge arms 63 affixed to the head 62 in the forward end of shaft 61, are arranged radially of said shaft and form an auxiliary jet rotor, the orbit of which is disposed within the upper portion of the rear of housing 51 (see Fig. 11). The snow-engaging rotor 53 revolves in the clockwise direction indicated by the arrow in Fig. 11, while the discharge nozzles of jet arms 63 are curved in clockwise direction but rotate counterclockwise, to cause expulsion of hot gases at exceedingly high velocities to drive the jet rotor connected to the snow-engaging rotor through reduction gearing 55, in counter clockwise direction.

In operation, snow or other material is plowed and collected in the rotor casing 51 and the main snow-removing rotor 53 moves and disintegrates the accumulated material, centrifugally flinging the material upwardly through the discharge chute 52.

Closely coordinated with the operation of the conventional rotary snow plow parts described, my auxiliary jet rotor disintegrates the snow or other material in its upward passage to the discharge chute 52, creating through the fast revolution of the jet discharge conduits 63 and the blasts of hot air discharged at terrific velocity, a suction effect in the upper and rear portion in the main rotor casing. Heat from the discharges of arms 63 melts snow and ice, lubricating the flow and dissipating to a very material extent, the volume of snow and ice delivered to the discharge chute 52. The combinative effect of the jet arms 63 with the upper and rear portion of the main rotor housing 50 and the location of discharge chute 52, causes the terrific expansion of products of combustion from the jet discharge nozzles to produce a resultant inward and upward movement of air through the discharge chute 52 at very high velocity.

In the embodiment shown in Figs. 10 and 11, the jet rotor comprising the conduit arms 63 and head 62, is driven not only through the expulsion of the blasts of hot gases from the nozzles of conduits 63, but also from the driven shaft of the turbo-supercharger.

It will of course, be understood that driving connection between the shaft of the turbine and super-charger of my unit TS may be eliminated or may be made disconnectible if desired.

From the foregoing description, it will be seen that I have provided a novel and economical jet-revolved apparatus adapted to greatly accelerate the removal, discharge and wide dispersion of snow, ice and other materials when used in combination with a material-plowing or guiding element such as a mold board or such as various shaft driven, snow-moving devices.

It will further be seen that my improved apparatus, when operating on snow or ice, rapidly melts and dissipates a substantial volume of the material plowed. It operates further to disintegrate and propel material towards the discharge of the plow prior to the jet blast action of hot air or other gaseous material into and against the snow and ice.

It will of course, be understood that various changes may be made in the form, details, arrangement and proportions of the parts without departing from the scope of my invention.

What I claim is:

1. Apparatus for accelerating the discharge and dispersion of material such as snow, comprising a rotary jet-discharge element adapted to be attached to a material guiding member such as a mold board, said element having a passage formed therein adapted for connection with the discharge of a source of jet power, said element further having a series of jet-forming discharge ends communicating with said passage and arranged circumferentially of the axis of said element and positioned to direct jet blasts against and into the snow or other material guided by said member.

2. A jet-driven, material-moving rotor adapted for attachment to a plowing or guiding member such as a mold board, comprising a material-engaging element mounted for revolution, said element having a passage formed therein adapted for connection with the discharge of a source of jet power, said passage having a jet-forming discharge end positioned to revolve said element by jet expulsion and to also direct a blast against material moving along said plowing or guiding member to accelerate discharge of such material.

3. A jet-driven, material-moving rotor adapted for attachment to a plowing or guiding member such as a mold board, comprising a material-propelling element mounted for revolution and having a peripheral portion formed for arrangement with said plowing member to progress material moving along the face of said plowing member, said element having a passage formed therein provided with an intake adapted to be connected during revolution of said element with the discharge of a source of jet power, said passage terminating in a jet end disposed eccentrically of the axis of said element and positioned to direct a blast against material moving along said plowing member and to furthermore, revolve said element by jet expulsion.

4. A jet-driven, material-moving rotor adapted for attachment to a plowing or guiding member such as a mold board, comprising a material-engaging element mounted for revolution and having a peripheral portion adapted to progress material engaged thereby, said element having an intake passage formed therein, adapted for connection during revolution of said element with the discharge of a source of jet power, said element having a series of jet-forming discharge ends communicating with said passage and arranged circumferentially of the axis of said element and positioned to direct jet blasts to revolve said element by jet expulsion and to further direct jet blasts against material moving along said plowing element.

5. A jet-driven, material-moving rotor adapted for attachment to a plowing member, having a spirally arranged, material-engaging portion adapted in operation to cooperate with the face of said plowing member to accelerate discharge movement of material and having a passage extending through said rotor for connection with the discharge of a source of jet power, said passage terminating at its outer end in a series of discharge jets, said jets being arranged circumferentially relative to the axis of said rotor and being directed to revolve said rotor by jet expulsion and to also direct blasts against material moving along said plowing member to further accelerate discharge of said material.

6. The structure set forth in claim 5, in combination with a mold board plowing member having a flared outer end and wherein the general figure generated by revolution of said rotor is a truncated cone and has its periphery disposed nearly tangential to said flared outer end.

7. In combination with a material-guiding member such as the mold board of a snow plow of a combustion type burner, a turbo-supercharger unit attached to said burner and supported thereby with its discharge connected to the intake mechanism of said burner, to produce a jet propulsion discharge, and a rotary discharge nozzle connected with said burner and directed into and against the material guided by said member to effect ejection and dispersion of such material.

8. In combination with a material-guiding element such as the mold board of a snow plow, a jet propulsion burner mounted at the rear of said member, a rotary discharge nozzle mounted at the front of said member and connected with the discharge of said burner, said nozzle being positioned to direct a hot blast into and against the material guided from said member to effect dissipation thereof.

9. The combination with a mold board for removing snow and other material of a jet propulsion unit positioned to direct a high velocity blast against material being moved along the face of said mold board and having a rotary discharge jet nozzle directed against said material to accelerate movement of the material in a general direction of discharge.

10. Apparatus for accelerating the discharge movement of a plowing member, comprising a jet propulsion unit, means for mounting said unit at the rear of said plowing member, said unit having a discharge conduit adapted to extend to the material-moving portion of said plowing member, a material-moving rotor adapted for attachment to said plowing member and comprising a rotary element having a peripheral portion constructed for arrangement with said plowing member to accelerate the progress of material initially moved by said plowing member, said element having a passage formed therein, means for connecting said discharge conduit with said passage and said rotary element having a discharge jet at the outer end thereof positioned to revolve said rotary element by jet expulsion and to also direct a high velocity blast against material moved by said plowing member.

11. Apparatus for accelerating the discharge movement of a plowing member having in combination a jet propulsion burner unit comprising a jet propulsion burner, a supercharger associated with the air intake of said burner and a turbine associated with the discharge of said burner for driving said supercharger, means for mounting said unit upon the rear portion of said plowing member, said unit having a discharge conduit adapted to extend to the material-moving portion of said plowing member, a material-moving rotor adapted for attachment to said plowing member and comprising a rotary element having an auger-like, peripheral portion constructed for arrangement with said plowing member to accelerate the movement of material by said plowing member, said element having a passage formed therein, means for connecting the discharge conduit of said jet burner unit with said passage and said rotary element having at least one discharge jet at the outer end thereof, positioned to revolve said rotary element by jet expulsion and to also direct a high velocity blast against material moved by said plowing member in a direction to accelerate the discharge movement of such material.

12. Apparatus for accelerating the discharge function of a plow mold board having in combination a jet propulsion burner unit, means for mounting said unit upon the rear portion of said mold board and supporting the same thereon, said unit having a discharge conduit adapted to extend to the concave front face of said mold board, a material-moving rotor comprising an auger-like rotary element having a passage formed therein, means for connecting the discharge conduit of said burner unit with said passage with freedom of revolution of said rotary element, said rotary element having a plurality of circumferentially spaced discharge jets at the outer end thereof positioned to revolve said rotary element by jet expulsion and to also direct high velocity blasts into and against material moved by said mold board to further accelerate the discharge of such material.

13. Apparatus for accelerating the discharge and dissipation of material from a rotary snow plow or the like, having a shaft driven rotor arranged for discharge into a material-directing, discharge chute, said apparatus comprising a rotary nozzle mounted at the rear of said rotor and revolving in an orbit juxtaposed to said material discharge chute, said nozzle having a plurality of circumferentially arranged discharge ports positioned to exert driving torque on said nozzle and to discharge high velocity blasts into and against material propelled by said rotor.

14. The structure set forth in claim 13 wherein the discharge ends of said nozzle revolve in a path intersecting the general travel of material from said rotor, thereby disintegrating and expanding said material in the discharge thereof.

EDWARD RUSSELL GREER.

No references cited.